(12) United States Patent
Abe

(10) Patent No.: US 11,060,242 B2
(45) Date of Patent: Jul. 13, 2021

(54) SHEET MANUFACTURING APPARATUS

(71) Applicant: SEIKO EPSON CORPORATION, Tokyo (JP)

(72) Inventor: Takashi Abe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 16/287,371

(22) Filed: Feb. 27, 2019

(65) Prior Publication Data
US 2019/0264391 A1    Aug. 29, 2019

(30) Foreign Application Priority Data

Feb. 28, 2018 (JP) ............................. JP2018-035258

(51) Int. Cl.
| | | |
|---|---|---|
| D21F 7/00 | (2006.01) | |
| D21F 9/00 | (2006.01) | |
| D21B 1/10 | (2006.01) | |
| D21C 5/02 | (2006.01) | |

(52) U.S. Cl.
CPC .............. *D21F 7/006* (2013.01); *D21B 1/10* (2013.01); *D21C 5/02* (2013.01); *D21F 9/00* (2013.01)

(58) Field of Classification Search
CPC ... D21F 7/006; D21F 1/56; D21F 1/58; D21F 1/66; D21F 9/00; D21C 5/02; D21G 9/0081; D21B 1/10; D21B 1/061; D21B 1/063; D21B 1/066; D21B 1/068; D21B 1/08
USPC .............. 162/191, 194, 195, 260, 264, 286
See application file for complete search history.

(56) References Cited

U.S. PATENT DOCUMENTS

| | | | | |
|---|---|---|---|---|
| 4,456,502 A | * | 6/1984 | Bollani | .................... D21F 7/006 162/133 |
| 6,327,948 B1 | * | 12/2001 | Tuori | ...................... B26D 7/015 83/177 |
| 6,524,443 B2 | * | 2/2003 | Doelle | ..................... B26D 7/18 162/264 |
| 6,605,184 B1 | | 8/2003 | Vikio | |

(Continued)

FOREIGN PATENT DOCUMENTS

| | | | | |
|---|---|---|---|---|
| DE | 202016100653 | * | 3/2016 | ............. D21F 7/006 |
| EP | 3064643 A1 | | 9/2016 | |

(Continued)

OTHER PUBLICATIONS

DE 202016100653, English language machine translation [epo.org] (Year: 2016).*

(Continued)

*Primary Examiner* — Eric Hug
(74) *Attorney, Agent, or Firm* — Oliff PLC

(57) ABSTRACT

A sheet manufacturing apparatus includes a sheet forming portion that forms a sheet using a material including fibers, a transport portion that transports the sheet, a cutting portion that cuts one edge portion and the other edge portion of the sheet positioned in a direction intersecting a transport direction of the sheet, a first coarse crushing portion that coarsely crushes a first surplus portion generated by cutting the one edge portion by the cutting portion, and a second coarse crushing portion that coarsely crushes a second surplus portion generated by cutting the other edge portion by the cutting portion.

17 Claims, 8 Drawing Sheets

(56) References Cited

U.S. PATENT DOCUMENTS

| | | | |
|---|---|---|---|
| 8,968,519 B2* | 3/2015 | Raines | D21H 25/08 |
| | | | 162/286 |
| 2002/0088588 A1 | 7/2002 | Doelle et al. | |
| 2013/0220564 A1* | 8/2013 | Michaud | D21F 7/006 |
| | | | 162/194 |

FOREIGN PATENT DOCUMENTS

| | | |
|---|---|---|
| JP | S59-15593 A | 1/1984 |
| JP | 2002-506147 A | 2/2002 |
| JP | 2009-299231 A | 12/2009 |
| JP | 2016-182726 A | 10/2016 |

OTHER PUBLICATIONS

Jul. 30, 2019 Extended European Search Report issued in European Patent Application No. 19159370.6.

* cited by examiner

SHEET MANUFACTURING APPARATUS

The entire disclosure of Japanese Patent Application No: 2018-35258, filed Feb. 28, 2018, is expressly incorporated by reference herein.

BACKGROUND

1. Technical Field

The present invention relates to a sheet manufacturing apparatus.

2. Related Art

In recent years, it is widespread to recycle a used paper to produce a new paper material. A used paper processing apparatus that performs processing suitable for recycling for the used paper when recycling the used paper is known (for example, refer to JP-A-2009-299231).

A used paper processing apparatus described in JP-A-2009-299231 is provided with a first recycled pulp portion defibrating a cut paper piece of used paper to prepare recycled pulp, a deinked pulp portion bleaching the recycled pulp to prepare a deinked pulp, a paper making portion making the deinked pulp to prepare a recycled paper, a finishing portion cutting the recycled paper prepared in the paper making portion to a predetermined size, and a second recycled pulp portion returning a surplus paper piece (so-called "ear") generated in the finishing portion to the deinked pulp. Since the used paper processing apparatus includes the second recycled pulp portion, it is possible to prevent the surplus paper piece from being wasted.

The second recycled pulp portion includes a surplus paper piece tank, a surplus paper piece pulper, and a dilution tank. The surplus paper piece tank is a tank storing the surplus paper piece. The surplus paper piece pulper causes the surplus paper piece to be defibrated into a fiber, that is, to deinked pulp. The dilution tank dilutes the deinked pulp.

However, in the used paper processing apparatus described in JP-A-2009-299231, in addition to the surplus paper piece pulper, a pulper defibrating the cut paper piece into the fiber, that is, to deinked pulp is provided. In this manner, since the used paper processing apparatus includes a pulper defibrating the cut paper piece and a pulper (surplus paper piece pulper) defibrating the surplus paper piece, respectively, the size of the apparatus increases.

SUMMARY

An advantage of some aspects of the invention is to provide a sheet manufacturing apparatus which is advantageous in reducing the size of the apparatus and which can easily recycle a surplus portion generated from a sheet.

The invention can be realized in the following aspects.

According to an aspect of the invention, a sheet manufacturing apparatus includes a sheet forming portion that forms a sheet using a material including fibers, a transport portion that transports the sheet, a cutting portion that cuts one edge portion and the other edge portion of the sheet positioned in a direction intersecting a transport direction of the sheet, a first coarse crushing portion that coarsely crushes a first surplus portion generated by cutting the one edge portion by the cutting portion, and a second coarse crushing portion that coarsely crushes a second surplus portion generated by cutting the other edge portion by the cutting portion.

Accordingly, the first coarse crushing portion that coarsely crushes the first surplus portion and the second coarse crushing portion that coarsely crushes the second surplus portion may be provided separately from the other coarse crushing portion. Accordingly, the first surplus portion and the second surplus portion may be coarsely crushed. The coarsely crushed first surplus portion and the second surplus portion may be easily used, that is, easily recycled, for example, as a material for manufacturing a new sheet. In addition, when designing the sheet manufacturing apparatus, according to the apparatus configuration of the sheet manufacturing apparatus, arrangement positions (layout) of the first coarse crushing portion and the second coarse crushing portion may be appropriately changed, and thus it is advantageous for reducing the size of the sheet manufacturing apparatus.

In the sheet manufacturing apparatus, it is preferable that the first coarse crushing portion start coarsely crushing of the first surplus portion of which a portion is connected to the sheet, and the second coarse crushing portion start coarsely crushing of the second surplus portion of which a portion is connected to the sheet.

For example, in a case where the first surplus portion after having separated (completely separated) from a usable portion, is intended to be coarsely crushed by the first coarse crushing portion, there is a possibility that the first surplus portion may deviate from the first coarse crushing portion depending on conditions of use of the sheet manufacturing apparatus. Therefore, by starting the coarse crushing of the first surplus portion by the first coarse crushing portion as described above, as soon as the first surplus portion is formed, the first surplus portion may be coarsely crushed immediately by the first coarse crushing portion. Accordingly, the first surplus portion may be accurately coarsely crushed. Similarly, as soon as the second surplus portion is formed, the second surplus portion may be coarsely crushed immediately by the second coarse crushing portion.

In the sheet manufacturing apparatus, it is preferable that the first coarse crushing portion have at least one first rotary blade for coarsely crushing the first surplus portion by rotation, and the second coarse crushing portion have at least one second rotary blade for coarsely crushing the second surplus portion by rotation.

Accordingly, it is possible to coarsely crush the first surplus portion and the second surplus portion without excess or deficiency. In addition, when designing the sheet manufacturing apparatus, according to the apparatus configuration of the sheet manufacturing apparatus, arrangement positions (layout) of the first coarse crushing portion and the second coarse crushing portion may be appropriately changed, and thus it contributes to reduction in the size of the sheet manufacturing apparatus.

In the sheet manufacturing apparatus, it is preferable that the first rotary blade rotate around a direction intersecting with the transport direction as an axis, and the second rotary blade rotate around a direction intersecting with the transport direction as an axis.

Accordingly, the first surplus portion is smoothly inserted toward the first rotary blade while being transported in the transport direction of the sheet. Accordingly, the first surplus portion may be rapidly coarsely crushed. In addition, the second surplus portion is smoothly inserted toward the second rotary blade while being transported in the transport direction of the sheet. Accordingly, the second surplus portion may be rapidly coarsely crushed.

In the sheet manufacturing apparatus, it is preferable that the first rotary blade rotate around a direction along the transport direction as an axis, and the second rotary blade rotate around a direction along the transport direction as an axis.

Accordingly, even if the first surplus portion is inserted into any portion in a range where the first rotary blade is disposed in the first coarse crushing portion, the first surplus portion is accurately coarsely crushed there. In such a configuration, it is possible to ensure a range capable of being coarsely crushed by the first coarse crushing portion as wide as possible, which is a preferable configuration. In addition, even if the second surplus portion is inserted into any portion in a range where the second rotary blade is disposed in the second coarse crushing portion, the second surplus portion is accurately coarsely crushed there. In such a configuration, it is possible to ensure a range capable of being coarsely crushed by the second coarse crushing portion as wide as possible, which is a preferable configuration.

It is preferable that the sheet manufacturing apparatus further include a first guide portion that guides the first surplus portion to the first coarse crushing portion, and a second guide portion that guides the second surplus portion to the second coarse crushing portion.

Accordingly, the first surplus portion may be rapidly and accurately coarsely crushed by the first coarse crushing portion and the second surplus portion may be rapidly and accurately coarsely crushed by the second coarse crushing portion.

It is preferable that the sheet manufacturing apparatus further include a control unit, in which the control unit changes a coarse crushing speed of the first coarse crushing portion that coarsely crushes the first surplus portion according to a transport speed of the sheet, and changes a coarse crushing speed of the second coarse crushing portion that coarsely crushes the second surplus portion according to the transport speed of the sheet.

Accordingly, even if the transport speed is changed, it is possible to prevent the first surplus portion and the second surplus portion from being excessively pulled or excessively bent, and thus it is possible to coarsely crush each surplus portion without excess or deficiency.

In the sheet manufacturing apparatus, it is preferable that the first coarse crushing portion and the second coarse crushing portion operate in synchronism with each other.

Accordingly, for example, it is possible to prevent one of the first surplus portion coarsely crushed in the first coarse crushing portion and the second surplus portion coarsely crushed in the second coarse crushing portion from being pulled stronger than the other so that an unreasonable force is applied to the sheet, and to prevent deformation such as wrinkles from occurring.

In the sheet manufacturing apparatus, it is preferable that the first coarse crushing portion and the second coarse crushing portion operate independently of each other.

Accordingly, for example, in a case where the formation of the second surplus portion is omitted at the time of manufacturing the sheet, it is possible to manufacture the sheet by operating the first coarse crushing portion and stopping the second coarse crushing portion. Accordingly, it is possible to suppress the power consumption by the amount corresponding to the stoppage of the second coarse crushing portion, and energy saving may be achieved.

It is preferable that the sheet manufacturing apparatus further include an accumulation portion that accumulates a first coarse crushed piece in which the first surplus portion is coarsely crushed by the first coarse crushing portion and a second coarse crushed piece in which the second surplus portion is coarsely crushed by the second coarse crushing portion.

Accordingly, for example, when the materials coarsely crushed by each coarse crushing portion is transferred to another place, the transfer may be performed easily.

It is preferable that the sheet manufacturing apparatus further include a defibrating portion that defibrates a coarse crushed piece discharged from a coarse crushing portion for coarsely crushing a raw material including fibers, in which in a state where the coarse crushed piece, the first coarse crushed piece, and the second coarse crushed piece are mixed, the mixture is defibrated in the defibrating portion.

Accordingly, the first surplus portion and the second surplus portion may be recycled for manufacturing the sheet.

It is preferable that the sheet manufacturing apparatus further include a coarse crushing portion that coarsely crushes a raw material including fibers, a defibrating portion that defibrates the coarse crushed piece coarsely crushed by the coarse crushing portion, and a transfer portion that transfers the first coarse crushed piece and the second coarse crushed piece accumulated in the accumulation portion to the defibrating portion.

Accordingly, the first surplus portion and the second surplus portion may be recycled for manufacturing the sheet.

It is preferable that the sheet manufacturing apparatus further include a raw material supply portion that supplies a raw material containing fibers, a coarse crushing portion that coarsely crushes the raw material, and a hopper that receives the coarse crushed piece coarsely crushed by the coarse crushing portion, in which in a plan view, a direction where the raw material is transported to the coarse crushing portion and the transport direction of the sheet intersect with each other, and at least a portion of the accumulation portion and the hopper overlap each other.

Accordingly, since the accumulation portion and the hopper overlap in a plan view, it is possible to reduce the size of the sheet manufacturing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a sheet manufacturing apparatus of the invention will be described in detail based on preferred embodiments shown in the accompanying drawings.

First Embodiment

Figure 1:
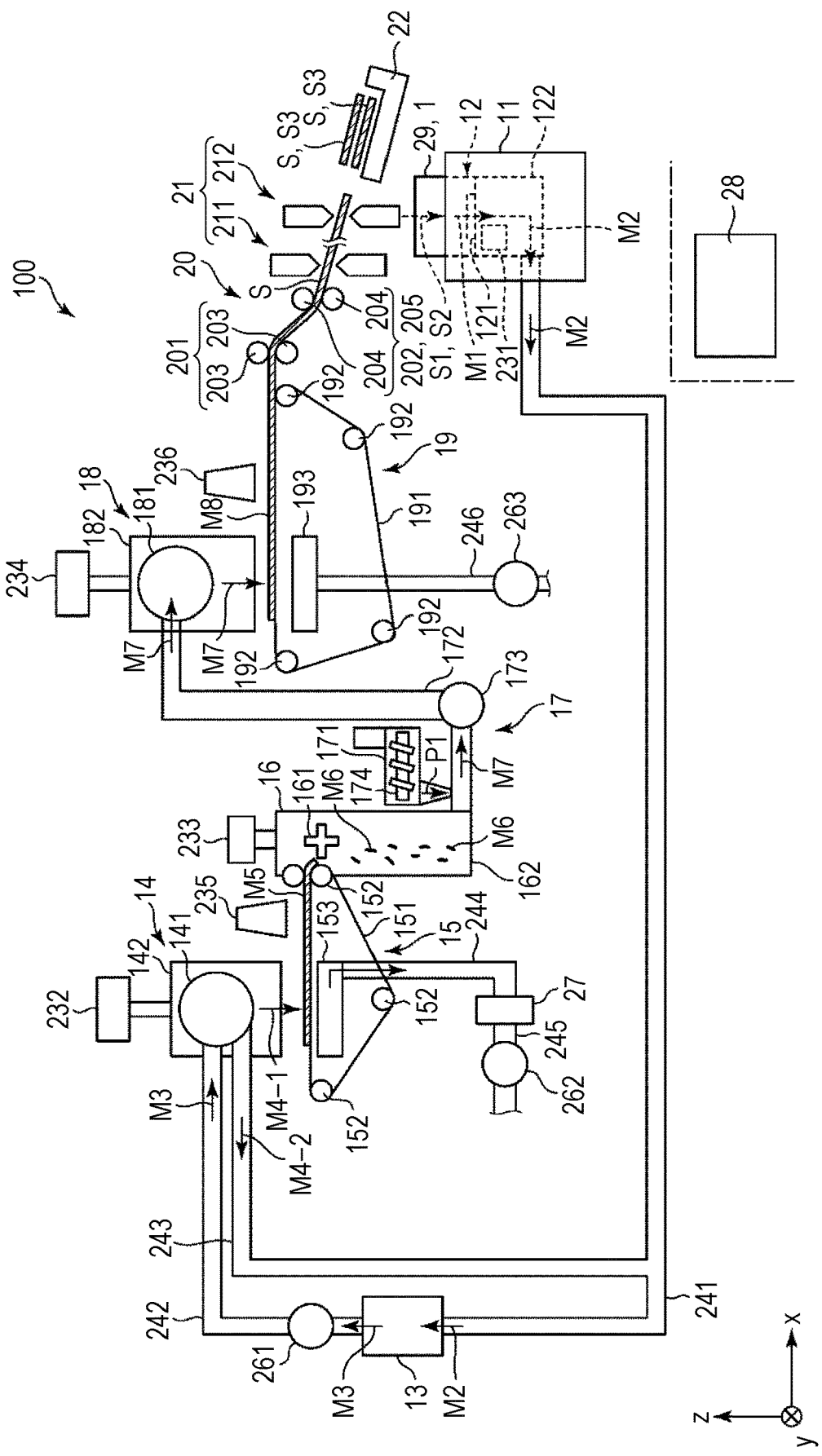
FIG. 1 is a schematic side view showing a sheet manufacturing apparatus (first embodiment) of the invention.
Figure 2:
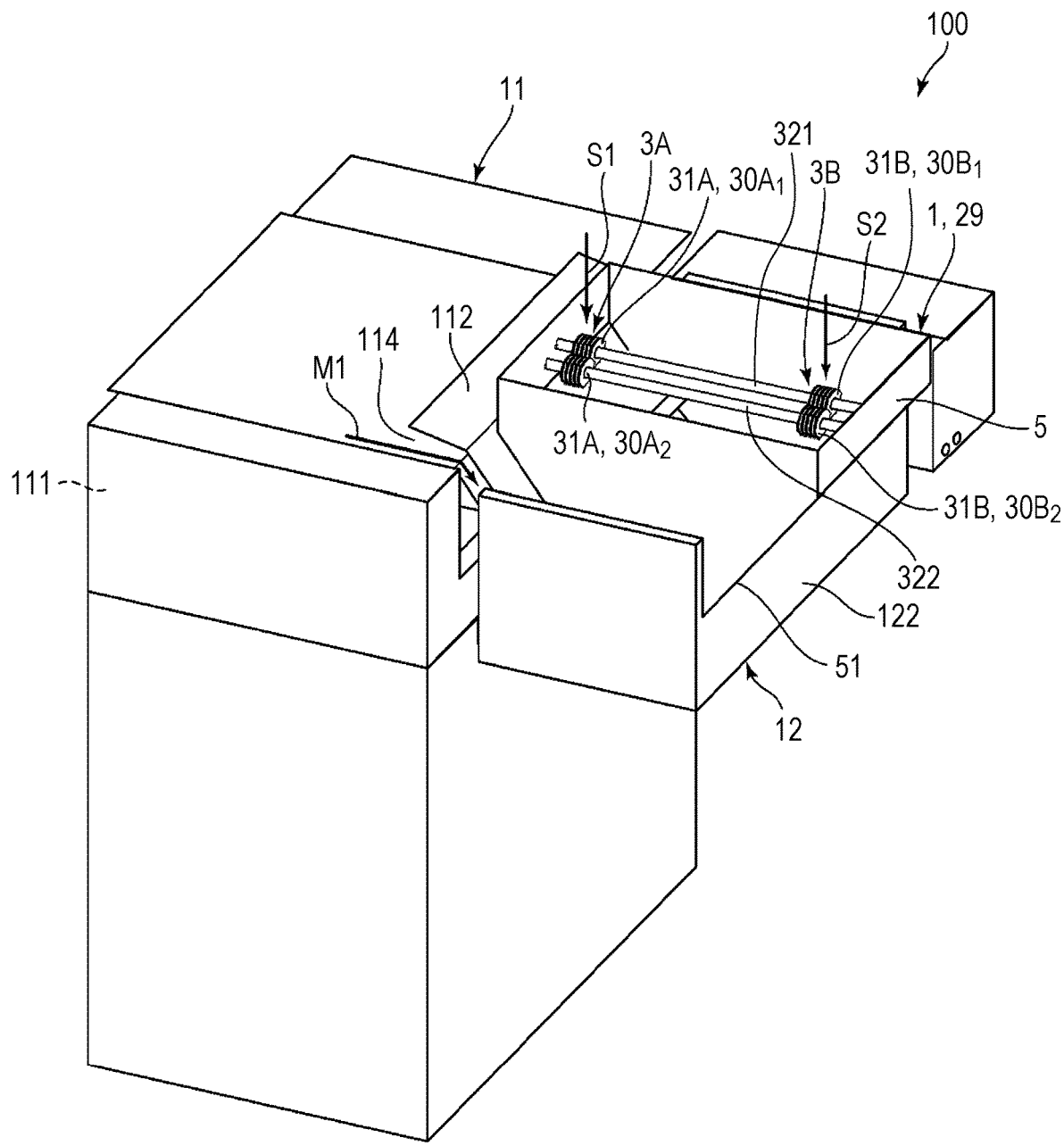
FIG. 2 is a perspective view showing a configuration in a vicinity of a most upstream side of the sheet manufacturing apparatus shown in FIG. 1.
Figure 3:
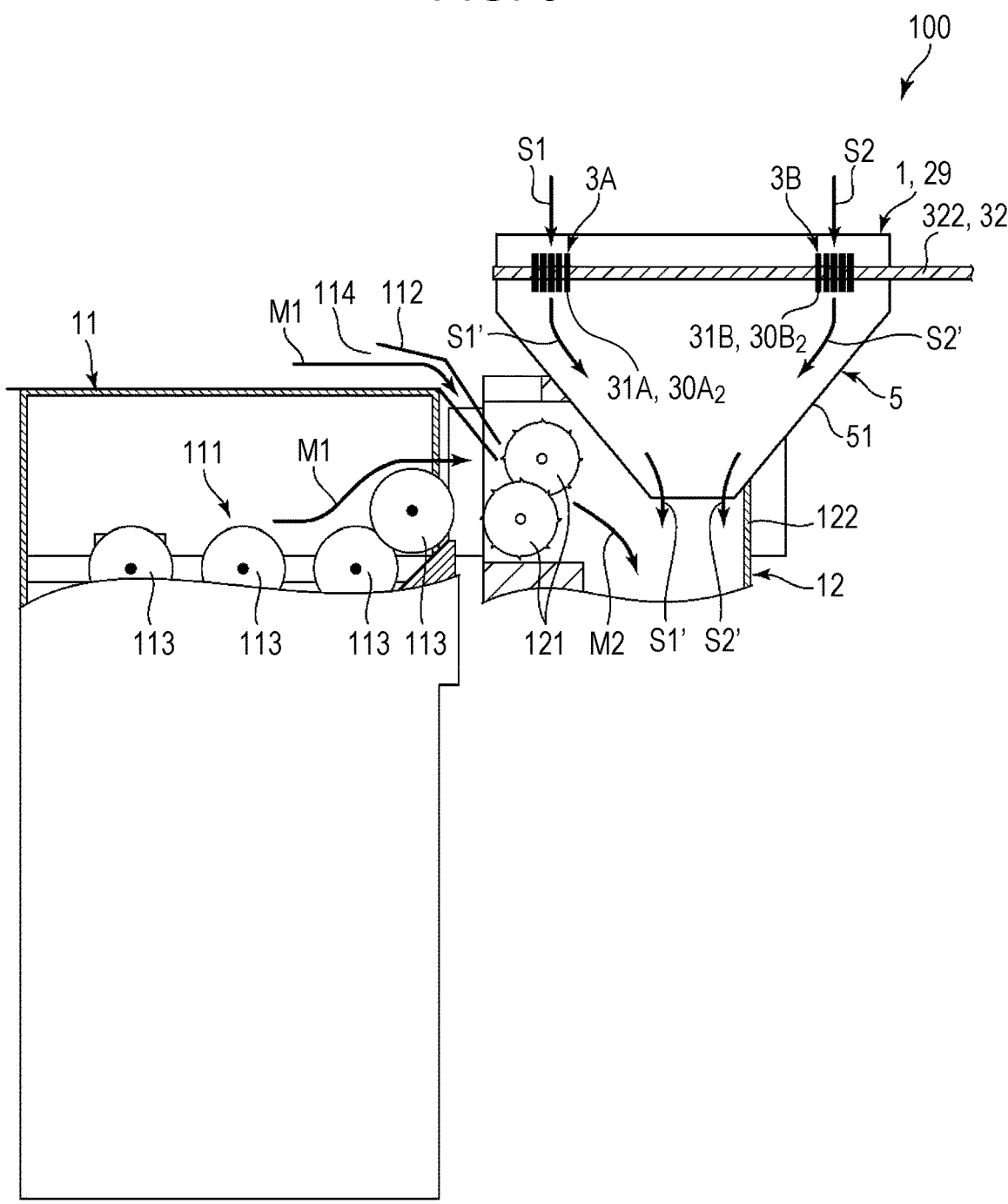
FIG. 3 is a partial vertical cross-sectional view showing the configuration in the vicinity of the most upstream side of the sheet manufacturing apparatus shown in FIG. 1.
Figure 4:
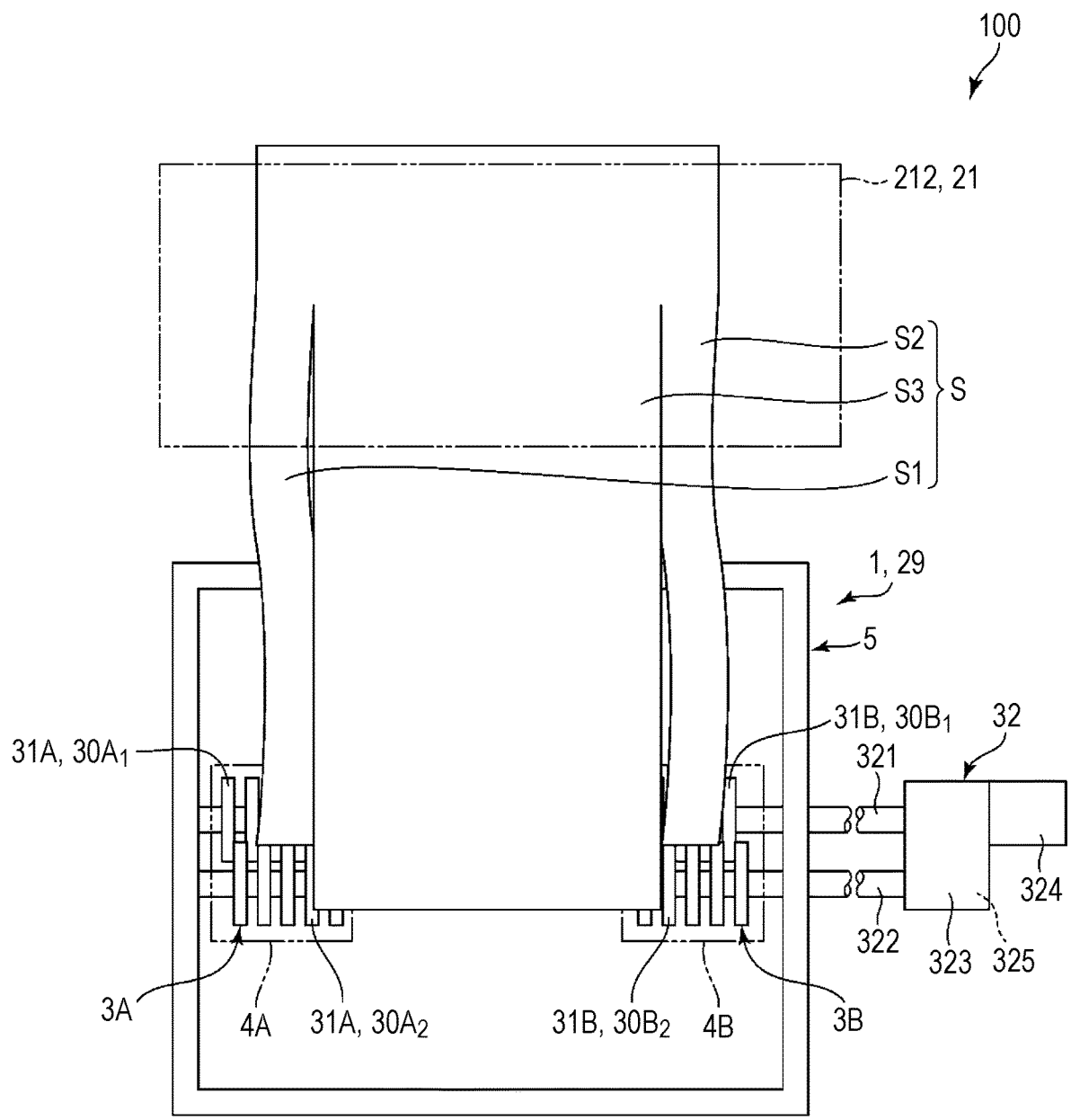
FIG. 4 is a plan view showing a state where a surplus portion of a sheet is coarsely crushed in the vicinity of the most upstream side of the sheet manufacturing apparatus shown in FIG. 1.
Figure 5:
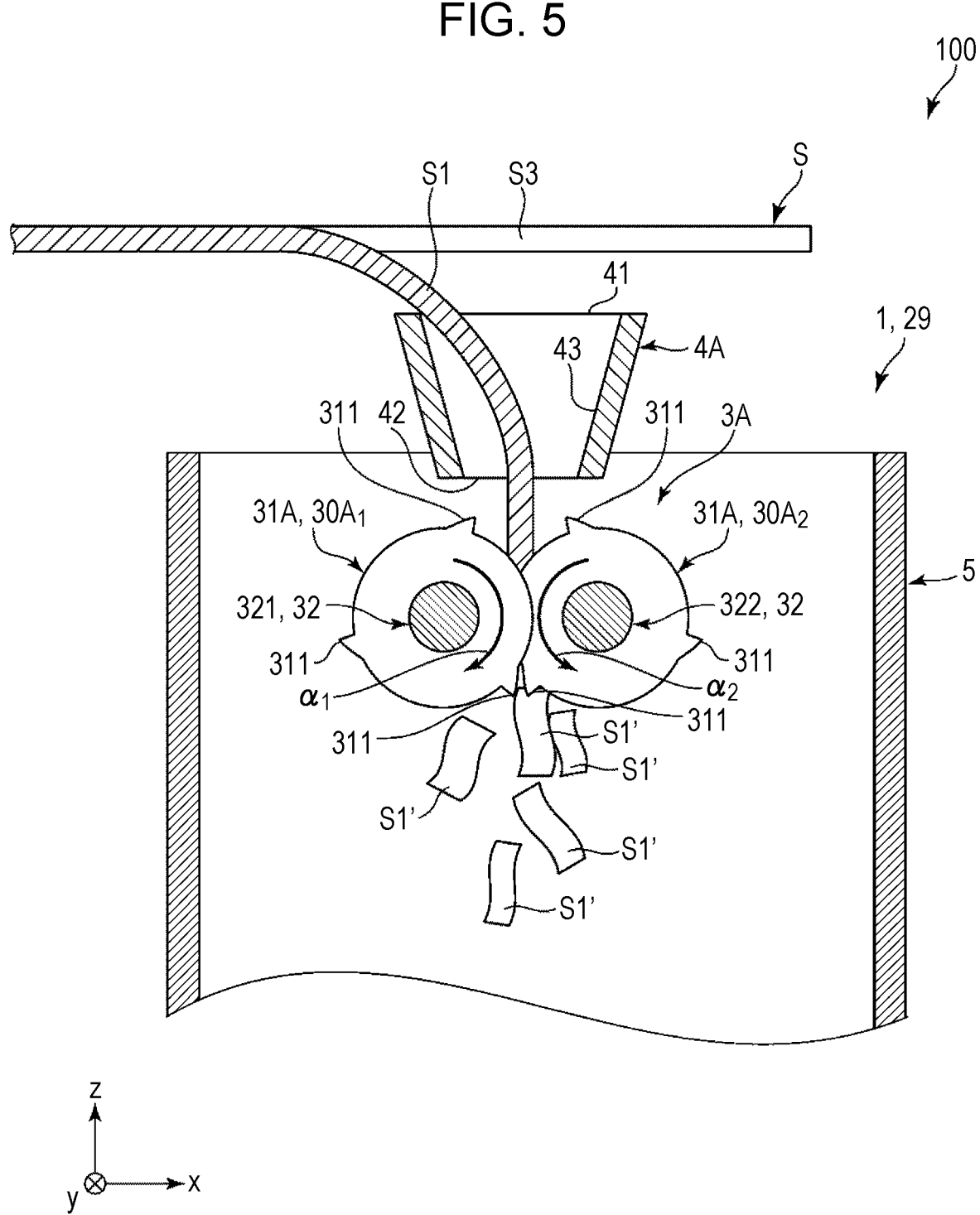
FIG. 5 is a vertical cross-sectional view showing the state where the surplus portion of the sheet is coarsely crushed in the vicinity of the most upstream side of the sheet manufacturing apparatus shown in FIG. 1.
Figure 6:
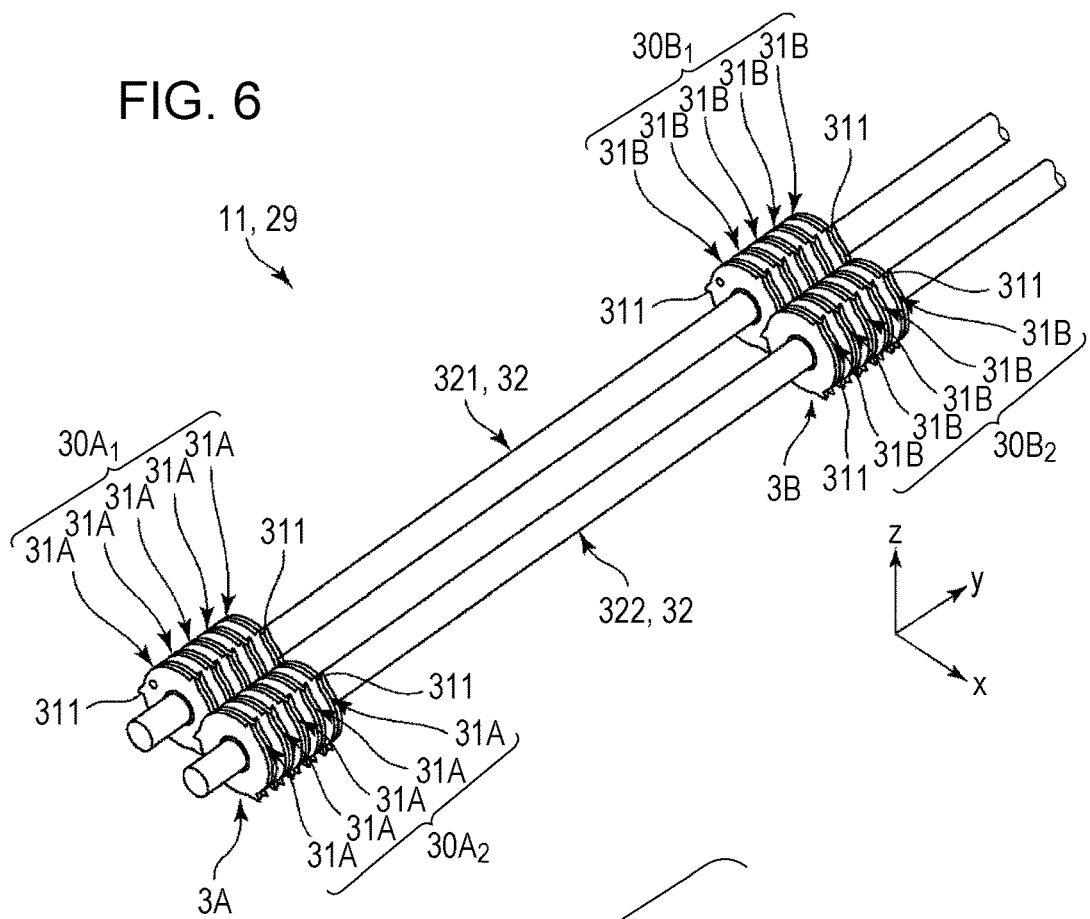
FIG. 6 is a perspective view showing a first coarse crushing portion and a second coarse crushing portion for coarsely crushing the surplus portion of the sheet in the vicinity of the most upstream side of the sheet manufacturing apparatus shown in FIG. 1.

FIG. 1 is a schematic side view showing a sheet manufacturing apparatus (first embodiment) of the invention. FIG. 2 is a perspective view showing a configuration in a vicinity of a most upstream side of the sheet manufacturing apparatus shown in FIG. 1. FIG. 3 is a partial vertical cross-sectional view showing the configuration in the vicinity of the most upstream side of the sheet manufacturing apparatus shown in FIG. 1. FIG. 4 is a plan view showing a state where a surplus portion of a sheet is coarsely crushed in the vicinity of the most upstream side of the sheet manufacturing apparatus shown in FIG. 1. FIG. 5 is a vertical cross-sectional view showing the state where the surplus portion of the sheet is coarsely crushed in the vicinity of the most upstream side of the sheet manufacturing apparatus shown in FIG. 1. FIG. 6 is a perspective view showing a first coarse crushing portion and a second coarse crushing portion for coarsely crushing the surplus portion of the sheet in the vicinity of the most upstream side of the sheet manufacturing apparatus shown in FIG. 1. Hereinafter, for convenience of description, as shown in FIG. 1, three axes orthogonal to each other are an x axis, a y axis, and a z axis. In addition, the xy plane including the x axis and the y axis is horizontal and the z axis is vertical. In addition, a direction where an arrow of each axis points is referred to as "positive" and an opposite direction is referred to as "negative". In addition, upper sides in FIGS. 1 to 3, 5 and 6 may be referred to as "upper" or "upward", and lower sides is referred to as "lower" or "downward".

The sheet manufacturing apparatus (used paper recycling apparatus) 100 of the invention is provided with a sheet forming portion 20 that forms a sheet S using a defibrated material M3 (material including fibers), a transport portion 205 that transports the sheet S, an one edge portion of the sheet S positioned in a direction intersecting with a transport direction by the transport portion 205, a cutting portion 21 having a second cutter 212 cutting the other edge portion, a first coarse crushing portion 3A that coarsely crushes a first surplus portion S1 generated by cutting the one edge portion of the sheet S by the second cutter 212 (cutting portion 21), and a second coarse crushing portion 3B that coarsely crushes a second surplus portion S2 generated by cutting the other edge portion of the sheet S by the second cutter 212 (cutting portion 21).

According to such an invention, as will be described later, the first coarse crushing portion 3A coarsely crushing the first surplus portion S1 and the second coarse crushing portion 3B coarsely crushing the second surplus portion S2 can be provided separately from a coarse crushing portion 12. As a result, the first surplus portion S1 and the second surplus portion S2 can be coarsely crushed. The coarse crushed first surplus portion S1 and the second surplus portion S2 can be easily used, for example, as a material for manufacturing a new sheet S, that is, can be easily recycled. In addition, when designing the sheet manufacturing apparatus 100, according to the apparatus configuration of the sheet manufacturing apparatus 100, the arrangement positions (layout) of the first coarse crushing portion 3A and the second coarse crushing portion 3B can be appropriately changed, and thus it is advantageous for reducing the size of the sheet manufacturing apparatus 100. The "edge portion" is a portion including an outer periphery of the sheet S.

As shown in FIG. 1, the sheet manufacturing apparatus 100 is provided with a raw material supply portion 11, a coarse crushing portion 12, a defibrating portion 13, a sorting portion 14, a first web forming portion 15, a subdividing portion 16, a mixing portion 17, a loosening portion 18, a second web forming portion 19, a sheet forming portion 20, a cutting portion 21, a stock portion 22, a collecting portion 27, and a surplus portion coarse crushing portion 29. In the embodiment, the surplus portion coarse crushing portion 29 is configured to include a surplus portion coarse crushing apparatus (surplus portion coarse crushing unit) 1. In addition, the sheet manufacturing apparatus 100 is provided with a humidifying portion 231, a humidifying portion 232, a humidifying portion 233, a humidifying portion 234, a humidifying portion 235, and a humidifying portion 236. In addition, the sheet manufacturing apparatus 100 is provided with a blower 261, a blower 262, and a blower 263.

The operation of each part (for example, first coarse crushing portion 3A and second coarse crushing portion 3B of surplus portion coarse crushing apparatus 1) of the sheet manufacturing apparatus 100 is controlled by a control unit 28. The control 28 having a processor or integrated circuit. In addition, the control unit 28 may be built in the sheet manufacturing apparatus 100 or may be provided in an external device such as an external computer. For example, the external device may be communicated with the sheet manufacturing apparatus 100 via a cable or the like, may be communicated by wireless communication, or may be connected to the sheet manufacturing apparatus 100 via a network (for example, the Internet).

In addition, in the sheet manufacturing apparatus 100, a raw material supply step, a coarse crushing step, a defibrating step, a sorting step, a first web forming step, a dividing step, a mixing step, a loosening step, a second web forming step, a sheet forming step, and a cutting step are performed in this order to obtain a sheet S. In addition, in the sheet manufacturing apparatus 100, a surplus portion coarse crushing step is also performed after the cutting step, in addition to the steps until the sheet S is obtained.

Hereinafter, the configuration of each part will be described.

The raw material supply portion 11 is a portion that performs the raw material supply step of supplying a raw material M1 to the coarse crushing portion 12. This raw material M1 is a raw material including a fiber (cellulose fiber). The cellulose fiber is not limited as long as it is fibrous mainly formed of cellulose (narrowly defined cellulose) as a compound, and may contain hemicellulose and lignin in addition to cellulose (narrowly defined cellulose). In addition, the raw material M1 may be woven fabric, nonwoven fabric, or the like in any form. In addition, the raw material M1 may be, for example, recycled paper produced (recycled) by defibrating a used paper, Yupo paper (registered trademark) of synthetic paper, or may not be recycled paper. In addition, in the embodiment, the raw material M1 is the used paper (sheet).

As shown in FIG. 3, the raw material supply portion 11 has a first supply portion 111 supplying the raw material M1 by automatic feeding and a second supply portion 112 supplying the raw material M1 by manual insertion.

The first supply portion 111 has a plurality of rollers 113 controlled by the control unit 28. By rotating these rollers 113, the raw material M1 can be transported to the side of the coarse crushing portion 12. As a result, the raw material M1 is fed, that is, supplied to the coarse crushing portion 12.

The second supply portion 112 is disposed above the first supply portion 111. The second supply portion 112 has an insertion port 114 into which the raw material M1 is inserted. For example, by manually inserting the raw material M1 into the insertion port 114, the raw material M1 can be fed, that is, supplied to the coarse crushing portion 12.

In the embodiment, the raw material supply portion 11 includes both the first supply portion 111 and the second supply portion 112, and the raw material supply portion 11 is not limited thereto, and one of these may be omitted.

The coarse crushing portion 12 is a portion that performs the coarse crushing step of crushing the raw material M1 supplied from the raw material supply portion 11 in the air (in air). As shown in FIG. 3, the coarse crushing portion 12 has a pair of coarse crushing blades 121 controlled by the control unit 28 and a chute 122 (hopper).

The pair of coarse crushing blades 121 has, for example, a cross cut function. By rotating in a direction opposite to each other, the pair of coarse crushing blades 121 can coarsely crush, that is, cut the raw material M1 (used sheet) supplied from the first supply portion 111 or the second supply portion 112 therebetween into coarse crushed pieces M2. The shape and size of the coarse crushed piece M2 are preferably suitable for defibrating processing in the defibrating portion 13. For example, it is preferably a small piece having a side length of 100 mm or less, more preferably a small piece of 10 mm or more and 70 mm or less. The pair of coarse crushing blades 121 is not limited to those having a cross cut function, and may have, for example, a straight cut function or a spiral cut function.

The chute 122 has the pair of coarse crushing blades 121 disposed therein, and has a box shape, for example. As a result, the chute 122 can receive the coarse crushed piece M2 that is coarsely crushed and dropped by the coarse crushing blade 121.

In addition, in the chute 122, the humidifying portion 231 is disposed (refer to FIG. 1). The humidifying portion 231 humidifies the coarse crushed piece M2 in the chute 122. The humidifying portion 231 has a filter (not shown) containing moisture, and is formed of a vaporization type (or warm air vaporization type) humidifier which supplies humidified air having increased humidity to the coarse crushed piece M2 by allowing air to pass through the filter. By supplying the humidified air to the coarse crushed piece M2, it is possible to inhibit the adhesion of the coarse crushed piece M2 to the chute 122 or the like due to static electricity.

The chute 122 is connected to the defibrating portion 13 via a pipe (flow path) 241. The coarse crushed piece M2 collected in the chute 122 passes through the pipe 241 and is transported to the defibrating portion 13.

The defibrating portion 13 is a portion that performs a defibrating step of defibrating the coarse crushed piece M2 in the air, that is, in a dry manner. By the defibrating processing at the defibrating portion 13, a defibrated material M3 serving as a material including the fiber can be generated from the coarse crushed piece M2. Here, "to defibrate" refers to unravel the coarse crushed piece M2 formed by binding a plurality of fibers to each fiber one by one. This unraveled material is the defibrated material M3. The shape of the defibrated material M3 is a linear shape or a belt shape. In addition, the defibrated material M3 may exist in a state of being intertwined to form a lump, that is, in a state of forming a so-called "Dama" (lump).

In the embodiment, for example, the defibrating portion 13 is formed of an impeller mill having a rotor rotating at high speed and a liner positioned on an outer periphery of the rotor. The raw material M1 (used sheet) coarsely crushed by the coarse crushing portion 12, that is, the coarse crushed piece M2 flows into the defibrating portion 13. Thereafter, the coarse crushed piece M2 is interposed between the rotor and the liner and defibrated to be the defibrated material M3.

In addition, the defibrating portion 13 can generate a flow of air (air flow) from the coarse crushing portion 12 to the sorting portion 14 by the rotation of the rotor. As a result, the coarse crushed piece M2 can be sucked from the pipe 241 to the defibrating portion 13. In addition, after the defibrating processing, the defibrated material M3 can be sent out to the sorting portion 14 via a pipe 242.

A blower 261 is installed in the middle of the pipe 242. The blower 261 is an air flow generating device that generates an air flow toward the sorting portion 14. As a result, the delivery of the defibrated material M3 to the sorting portion 14 is promoted.

The sorting portion 14 performs the sorting step of sorting the defibrated material M3 according to the length of the fiber. In the sorting portion 14, the defibrated material M3 is sorted into a first sorted object M4-1 and a second sorted object M4-2 larger than the first sorted object M4-1. The first sorted object M4-1 has a size suitable for the subsequent manufacture of the sheet S. The average length is preferably 1 µm or more and 30 µm or less. On the other hand, the second sorted object M4-2 includes, for example, those insufficiently defibrated, those in which the defibrated fibers are aggregated excessively, and the like.

The sorting portion 14 has a drum portion 141 and a housing portion 142 that houses the drum portion 141.

The drum portion 141 is formed of a cylindrical mesh body and is a sieve that rotates about the central axis. The defibrated material M3 flows into the drum portion 141. As the drum portion 141 rotates, the defibrated material M3 smaller than a mesh opening is sorted as a first sorted object M4-1, and the defibrated material M3 larger than the mesh opening is sorted as a second sorted object M4-2.

The first sorted object M4-1 falls from the drum portion 141.

On the other hand, the second sorted object M4-2 is sent out to a pipe (flow path) 243 connected to the drum portion 141. The pipe 243 is connected to the pipe 241 on the side (downstream side) opposite to the drum portion 141. The second sorted object M4-2 passed through the pipe 243 joins the coarse crushed piece M2 in the pipe 241 and flows into the defibrating portion 13 with the coarse crushed piece M2. As a result, the second sorted object M4-2 is returned to the defibrating portion 13 and is subjected to the defibrating processing with the coarse crushed piece M2.

In addition, the first sorted object M4-1 from the drum portion 141 falls while dispersing in the air and heads toward the first web forming portion (separation portion) 15 located below the drum portion 141. The first web forming portion 15 is a portion for performing the first web forming step of forming a first web M5 from the first sorted object M4-1. The first web forming portion 15 has a mesh belt (separation belt) 151, three stretching rollers 152, and a suction portion (suction mechanism) 153.

The mesh belt 151 is an endless belt, and the first sorted object M4-1 is accumulated. The mesh belt 151 is wrapped around three stretching rollers 152. By rotationally driving the stretching roller 152, the first sorted object M4-1 on the mesh belt 151 is transported to the downstream side.

The first sorted object M4-1 is larger than the mesh opening of the mesh belt 151. As a result, the first sorted object M4-1 is restricted from passing through the mesh belt 151, and thus can be accumulated on the mesh belt 151. In addition, since the first sorted object M4-1 is accumulated on the mesh belt 151 while being transported to the downstream side with the mesh belt 151, the first sorted object M4-1 is formed as a layered first web M5.

In addition, for example, there is a possibility that dirt, dust, and the like may be mixed in the first sorted object M4-1. The dirt and dust may be generated, for example, by coarsely crushing or defibrating. Such dirt and dust are collected in the collecting portion 27 e described later.

The suction portion 153 can suck air from below the mesh belt 151. As a result, the dirt and dust passed through the mesh belt 151 can be sucked with air.

In addition, the suction portion 153 is connected to the collecting portion 27 via a pipe (flow path) 244. The dirt and dust sucked by the suction portion 153 is collected in the collecting portion 27.

A pipe (flow path) 245 is further connected to the collecting portion 27. In addition, a blower 262 is installed in the middle of the pipe 245. By the operation of the blower 262, suction force can be generated by the suction portion 153. As a result, formation of the first web M5 on the mesh belt 151 is promoted. The first web M5 is obtained by removing the dirt, dust, and the like. In addition, the dirt and dust reach the collecting portion 27 after passing through the pipe 244 by operation of the blower 262.

The housing portion 142 is connected to the humidifying portion 232. The humidifying portion 232 is formed of a vaporization type humidifier similar to the humidifying portion 231. As a result, humidified air is supplied into the housing portion 142. By this humidified air, it is possible to humidify the first sorted object M4-1, and thus it is possible to inhibit the first sorted object M4-1 from adhering to an inner wall of the housing portion 142 due to electrostatic force.

On the downstream side of the sorting portion 14, the humidifying portion 235 is disposed. The humidifying portion 235 is formed of an ultrasonic humidifier for spraying water. As a result, moisture can be supplied to the first web M5, and thus the moisture content of the first web M5 is adjusted. By this adjustment, the first web M5 can be inhibited from adsorbing to the mesh belt 151 due to electrostatic force. As a result, the first web M5 is easily separated from the mesh belt 151 at a position where the mesh belt 151 is folded back by the stretching roller 152.

On the downstream side of the humidifying portion 235, the subdividing portion 16 is disposed. The subdividing portion 16 is a portion that performs the dividing step of dividing the first web M5 separated from the mesh belt 151. The subdividing portion 16 has a propeller 161 rotatably supported and a housing portion 162 housing the propeller 161. By the rotating propeller 161, it is possible to divide the first web M5. The divided first web M5 becomes a subdivided body M6. In addition, the subdivided body M6 descends within the housing portion 162.

The housing portion 162 is connected to the humidifying portion 233. The humidifying portion 233 is formed of a vaporization type humidifier similar to the humidifying portion 231. As a result, humidified air is supplied into the housing portion 162. By this humidified air, it is also possible to prevent the subdivided body M6 from adhering to the inner wall of the propeller 161 and the housing portion 162 due to electrostatic force.

On the downstream side of the subdividing portion 16, the mixing portion 17 is disposed. The mixing portion 17 is a portion that performs the mixing step of mixing the subdivided body M6 and a resin P1. The mixing portion 17 includes a resin supply portion 171, a pipe (flow path) 172, and a blower 173.

The pipe 172 connects the housing portion 162 of the subdividing portion 16 and a housing portion 182 of the loosening portion 18, and is a flow path through which a mixture M7 of the subdivided body M6 and the resin P1 passes.

The resin supply portion 171 is connected to the middle of the pipe 172. The resin supply portion 171 has a screw feeder 174. By rotationally driving the screw feeder 174, it is possible to supply the resin P1 as a powder or particles to the pipe 172. The resin P1 supplied to the pipe 172 is mixed with the subdivided body M6 to be the mixture M7.

The resin P1 bonds the fibers to each other in a later step. For example, a thermoplastic resin, a curable resin, or the like can be used, and a thermoplastic resin is preferably used. Examples of thermoplastic resin include polyolefin such as AS resin, ABS resin, polyethylene, polypropylene, ethylene-vinyl acetate copolymer (EVA), acrylic resins such as modified polyolefin, polymethyl methacrylate, polyesters such as polyvinyl chloride, polystyrene, polyethylene terephthalate, polybutylene terephthalate, polyamides (nylon) such as nylon 6, nylon 46, nylon 66, nylon 610, nylon 612, nylon 11, nylon 12, nylon 6-12, nylon 6-66, liquid crystal polymers such as polyphenylene ether, polyacetal, polyether, polyphenylene oxide, polyether ether ketone, polycarbonate, polyphenylene sulfide, thermoplastic polyimide, polyetherimide, aromatic polyester, various thermoplastic elastomers such as styrene type, polyolefin type, polyvinyl chloride type, polyurethane type, polyester type, polyamide type, polybutadiene type, trans polyisoprene type, fluoro rubber type, chlorinated polyethylene type, and the like. One type or two or more types selected from these can be used in combination. Preferably, as the thermoplastic resin, a polyester or a resin containing polyester is used.

As a material supplied from the resin supply portion 171, for example, a coloring agent for coloring the fibers, an aggregation inhibitor for inhibiting aggregation of the fibers or aggregation of the resin P1, a flame retardant for making the fibers less susceptible to burning, a paper strength enhancer for enhancing the paper strength of the sheet S, and the like may be included, in addition to the resin P1. Alternatively, a material in which these materials are previously contained (compounded) in the resin P1 may be supplied from the resin supply portion 171.

In addition, the blower 173 is installed on the downstream side of the resin supply portion 171 in the pipe 172. The subdivided body M6 and the resin P1 are mixed by the action of the rotating portion such as the blades of the blower 173. In addition, the blower 173 can generate the air flow towards the loosening portion 18. With this air flow, the subdivided body M6 and the resin P1 can be agitated in the pipe 172. As a result, the mixture M7 can flow into the loosening portion 18 in a state where the subdivided body M6 and the resin P1 are uniformly dispersed. In addition, the subdivided body M6 in the mixture M7 is loosened in the process of passing through the inside of the pipe 172, and becomes finer fibrous.

The loosening portion 18 is a portion for performing the loosening step of loosening the mutually entangled fibers in the mixture M7. The loosening portion 18 has a drum portion 181 and a housing portion 182 for housing the drum portion 181.

The drum portion 181 is formed of a mesh body having a cylindrical shape and is a sieve rotating around the central axis. The mixture M7 flows into the drum portion 181. As the drum portion 181 rotates, fibers or the like smaller than the mesh opening of the mixture M7 can pass through the drum portion 181. At that time, the mixture M7 is loosened.

In addition, the mixture M7 loosened by the drum portion 181 falls while dispersing in the air and heads toward the second web forming portion 19 located below the drum portion 181. The second web forming portion 19 is a portion for performing the second web forming step of forming a second web M8 from the mixture M7. The second web forming portion 19 includes a mesh belt (separation belt) 191, a stretching roller 192, and a suction portion (suction mechanism) 193.

The mesh belt 191 is an endless belt, and the mixture M7 is accumulated. The mesh belt 191 is wrapped around four stretching rollers 192. By rotationally driving the stretching roller 192, the mixture M7 on the mesh belt 191 is transported to the downstream side.

In addition, most of the mixture M7 on the mesh belt 191 is larger than the mesh opening of the mesh belt 191. As a result, the mixture M7 is restricted from passing through the mesh belt 191, and thus can be accumulated on the mesh belt 191. In addition, since the mixture M7 is accumulated on the mesh belt 191 while being transported to the downstream side with the mesh belt 191, the mixture M7 is formed as the layered second web M8.

The suction portion 193 can suck air from below the mesh belt 191. As a result, the mixture M7 can be sucked onto the mesh belt 191, and thus the accumulation of the mixture M7 is promoted on the mesh belt 191.

A pipe (flow path) 246 is connected to the suction portion 193. In addition, a blower 263 is installed in the middle of the pipe 246. By the operation of the blower 263, suction force can be generated by the suction portion 193.

Each of the pipe 241, the pipe 242, the pipe 243, the pipe 244, the pipe 245, the pipe 246, and the pipe 172 may be configured to include a single pipe or a connecting pipe connecting a plurality of pipes.

The housing portion 182 is connected to the humidifying portion 234. The humidifying portion 234 is formed of a vaporization type humidifier similar to the humidifying portion 231. As a result, humidified air is supplied into the housing portion 182. By this humidified air, it is possible to humidify the interior of the housing portion 182, and thus it is possible to inhibit the mixture M7 from adhering to the inner wall of the housing portion 182 due to electrostatic force.

On the downstream side of the loosening portion 18, the humidifying portion 236 is disposed. The humidifying portion 236 is formed of an ultrasonic humidifier similar to the humidifying portion 235. As a result, moisture can be supplied to the second web M8, and thus the moisture content of the second web M8 is adjusted. By this adjustment, the second web M8 can be inhibited from absorbing onto the mesh belt 191 due to electrostatic force. As a result, the second web M8 is easily separated from the mesh belt 191 at a position where the mesh belt 191 is folded back by the stretching roller 192.

The moisture amount (total moisture amount) applied to the humidifying portions 231 to 236 is, for example, preferably 0.5 parts by mass or more and 20 parts by mass or less with respect to 100 parts by mass of the material before humidification.

On the downstream side of the second web forming portion 19, the sheet forming portion 20 is disposed. The sheet forming portion 20 is a portion for forming the sheet S using a material including fibers. For example, the sheet forming portion 20 is a portion for performing the sheet forming step of forming the sheet S from the second web M8. The sheet forming portion 20 includes a pressurizing portion 201 and a heating portion 202. The second web M8 is one in which the defibrated material M3 undergoes each step on the upstream side of the sheet forming step and naturally contains the defibrated material M3.

The pressurizing portion 201 has a pair of calender rollers 203, and can apply pressure without heating the second web M8 between the calender rollers 203 (without melting resin P1). As a result, the density of the second web M8 is increased. The second web M8 is transported toward the heating portion 202. One of the pair of calender rollers 203 is a main driving roller driven by the operation of a motor (not shown), and the other is a driven roller.

The heating portion 202 has a pair of heating rollers 204, and can apply pressure while heating the second web M8 between the heating rollers 204. With this heating and pressurization, in the second web M8, the resin P1 is melted, and the fibers are bonded to each other via the molten resin P1. As a result, the sheet S is formed. The sheet S is transported toward the cutting portion 21. One of the pair of heating rollers 204 is a main driving roller driven by operation of a motor (not shown), and the other is a driven roller. In this manner, the heating portion 202 also functions as a transport portion 205 that transports the sheet S.

On the downstream side of the sheet forming portion 20, the cutting portion 21 is disposed. The cutting portion 21 is a portion that performs the cutting step of cutting the sheet S. The cutting portion 21 includes a first cutter 211 and a second cutter 212.

The first cutter 211 cuts the sheet S in a direction intersecting the transport direction (x direction) of the sheet S, that is, in the y direction. As a result, it is possible to adjust the entire length (length along the x direction) of the sheet S to a desired size.

The second cutter 212 is disposed on the downstream side of the first cutter 211. The second cutter 212 cuts one edge portion located in the direction (y direction) intersecting the transport direction and the other edge portion of the sheet S in a direction parallel to the transport direction. As a result, the sheet S is divided into a first surplus portion S1 generated by cutting one edge portion of the sheet S, a second surplus portion S2 generated by cutting the other edge portion, and a remaining usable portion S3 (refer to FIG. 4). The width of the usable portion S3 (length along the y direction) is adjusted to a desired size. The usable portion S3 can be used for printing, or writing, and used for machining, for example.

By cutting the first cutter 211 and the second cutter 212 as described above, the sheet S (usable portion S3) having a desired size is obtained. The sheet S is further transported to the downstream side and accumulated in the stock portion 22.

As described above, in the embodiment, the surplus portion coarse crushing portion 29 is configured to include the surplus portion coarse crushing apparatus 1. As shown in FIGS. 2 and 3, the surplus portion coarse crushing apparatus 1 is a portion for performing the surplus portion coarse crushing step of crushing the first surplus portion S1 and the second surplus portion S2. The surplus portion coarse crushing apparatus 1 is disposed adjacent to the upper side of the coarse crushing portion 12. In addition, as shown in FIG. 4, the surplus portion coarse crushing apparatus 1 is disposed on the downstream side in the transport direction of the sheet S and further on the negative side in the Z direction thereof with respect to the second cutter 212 of the cutting portion 21. The surplus portion coarse crushing apparatus 1 disposed in this manner is provided with a first coarse crushing portion 3A for crushing the first surplus portion S1, a second coarse crushing portion 3B for crushing the second surplus portion S2, a first guide portion 4A for guiding the first surplus portion S1 to the first coarse crushing portion 3A, a second guide portion 4B for guiding the second surplus portion S2 to the second coarse crushing portion 3B, and an accumulation portion 5 for accumulating the first surplus portion S1 and the second surplus portion S2 coarsely crushed. In FIGS. 2 and 3, the first guide portion 4A and the second guide portion 4B are omitted. Hereinafter, the configuration of each part will be described.

As shown in FIG. 4, the first coarse crushing portion 3A and the second coarse crushing portion 3B are arranged to be separated in the y direction. In the embodiment, although the first coarse crushing portion 3A and the second coarse crushing portion 3B have a cross cut function, the coarse crushing portions are not limited thereto, and for example, may have a straight cut function or a spiral cut function.

The first coarse crushing portion 3A coarsely crushes the first surplus portion S1 generated by cutting one edge portion (edge on negative side in y direction) of the sheet S with the second cutter 212. By this coarse crushing, the first surplus portion S1 becomes multiple coarse crushed pieces S1' (refer to FIGS. 3 and 5). The first coarse crushing portion 3A includes a plurality of first rotary blades 31A and a drive unit 32 that collectively rotatably drives these first rotary blades 31A. In the embodiment, although the first coarse crushing portion 3A has the plurality of first rotary blades 31A, it is not limited thereto, and may have at least one first rotary blade 31A.

The plurality of first rotary blades 31A coarsely crushes the first surplus portion S1 by rotation. As shown in FIG. 6, each of the plurality of first rotary blades 31A has a disc shape and has a wedge-shaped protrusion 311 protrudingly formed on the outer peripheral portion thereof. A plurality of protrusions 311 are arranged at regular intervals along the circumferential direction of the first rotary blade 31A. Although the number of protrusions 311 to be formed is three in the embodiment, it is not limited thereto, and may be one, two, or four or more, for example.

In addition, the plurality of first rotary blades 31A are divided into the same number of first rotary blades 31A in the first group $30A_1$ and the second group $30A_2$. Each of the first rotary blades 31A of the first group $30A_1$ is supported by a shaft member 321 of the drive unit 32 and arranged in a line along the shaft member 321. Each of the first rotary blades 31A of the second group $30A_2$ is supported by a shaft member 322 of the drive unit 32 and arranged in a line along the shaft member 322. A portion of the first rotary blade 31A of the first group $30A_1$ and the first rotary blade 31A of the second group $30A_2$ are alternately overlapped each other.

As shown in FIG. 4, the drive unit 32 includes the shaft member 321 rotatably supporting each of the first rotary blades 31A of the first group $30A_1$, the shaft member 322 rotatably supporting each of the first rotary blades 31A of the second group $30A_2$, a reduction gear 323 connected to the shaft member 321 and the shaft member 322, and a motor 324 connected to the reduction gear 323.

The shaft member 321 and the shaft member 322 are arranged in parallel with the direction intersecting the transport direction of the sheet S, that is, in the y direction, and are rotatably supported at both ends. The shaft member 321 can rotate with the first rotary blade 31A of the first group $30A_1$. The shaft member 322 is disposed apart from the shaft member 321 on the positive side in the x direction. The shaft member 322 can rotate with the first rotary blade 31A of the second group $30A_2$.

The reduction gear 323 has a plurality of gears 325 engaged with each other. One gear 325 of these gears 325 is connected to the shaft member 321 and the other gear 325 is connected to the shaft member 322.

The motor 324 is electrically connected to the control unit 28. As a result, the operation of the motor 324 is controlled by the control unit 28. By the operation of the motor 324, the rotational force is transmitted to the shaft member 321 and the shaft member 322 via the reduction gear 323. As a result, as shown in FIG. 5, each of the first rotary blades 31A of the first group $30A_1$ and each of the first rotary blades 31A of the second group $30A_2$ rotate in opposite directions to each other, that is, each of the first rotary blades 31A of the first group $30A_1$ rotates in a clockwise direction (direction of arrow $\alpha_1$) in the drawing, and each of the first rotary blades 31A of the second group $30A_2$ rotates in a counterclockwise direction (direction of arrow $\alpha_2$) in the drawing. With such rotation, the first surplus portion S1 is interposed between the first rotary blade 31A of the first group $30A_1$ and the first rotary blade 31A of the second group $30A_2$ to be coarsely crushed. The shape and size of the coarse crushed piece S1' are preferably suitable for the defibrating processing in the defibrating portion 13, for example, are preferably a small piece having a side length of 100 mm or less, and more preferably a small piece having a side length of 10 mm or more and 70 mm or less, similar to the coarse crushed piece M2.

The second coarse crushing portion 3B coarsely crushes the second surplus portion S2 generated by cutting the other edge portion (edge on positive side in y direction) of the sheet S with the second cutter 212. By this coarse crushing, the second surplus portion S2 becomes multiple coarse crushed pieces S2' (refer to FIG. 3). The second coarse crushing portion 3B includes a plurality of second rotary blades 31B. In the embodiment, although the second coarse crushing portion 3B has the plurality of second rotary blades 31B, it is not limited thereto, and may have at least one second rotary blade 31B.

The plurality of second rotary blades 31B coarsely crushes the second surplus portion S2 by rotation. As shown in FIG. 6, each of the plurality of second rotary blades 31B has a disc shape, similar to the first rotary blade 31A, and has a wedge-shaped protrusion 311 protrudingly formed on the outer peripheral portion thereof.

In addition, the plurality of second rotary blades 31B are divided into the same number of second rotary blades 31B in the first group $30B_1$ and the second group $30B_2$. Each of the second rotary blades 31B of the first group $30B_1$ is supported by the shaft member 321 of the drive unit 32 at a position away from the first group $30A_1$ on the positive side in the y direction, and arranged in a line along the shaft member 321. Each of the second rotary blades 31B of the second group 30B₂ is supported by the shaft member 322 of the drive unit 32 at a position away from the second group 30A₂ on the positive side in the y direction, and arranged in a line along the shaft member 322. A portion of the second rotary blade 31B of the first group 30B₁ and the second rotary blade 31B of the second group 30B₂ are alternately overlapped each other.

In addition to being able to rotationally drive the first rotary blade 31A, the drive unit 32 can also rotationally drive the second rotary blade 31B. That is, the drive unit 32 also serves as a drive unit for rotationally driving the second rotary blade 31B. As a result, the configuration of the surplus portion coarse crushing apparatus 1 (sheet manufacturing apparatus 100) is simple as compared with a case where a separate drive unit for rotationally driving the second rotary blade 31B is provided, and thus the size of the apparatus can be reduced. By the operation of the drive unit 32, each of the second rotary blades 31BA of the first group 30B₁ and each of the second rotary blade 31B of the second group 30B₂ rotate in opposite directions to each other, similar to each of the first rotary blades 31A of the first group 30A₁ and each of the first rotary blades 31A of the second group 30A₂. As a result, the second surplus portion S2 is interposed between the second rotary blade 31B of the first group 30B₁ and the second rotary blade 31B of the second group 30B₂ to be coarsely crushed. It is more preferable that the shape and size of the coarse crushed piece S2' be the same as the shape and size of the coarse crushed piece S1', for example.

In addition, it is preferable that the position, size, and number of the first rotary blade 31A and the second rotary blade 31B can be appropriately changed according to, for example, the width of the sheet S (length in the y direction).

As described above, in the surplus portion coarse crushing apparatus 1 (sheet manufacturing apparatus 100), the first coarse crushing portion 3A has at least one first rotary blade 31A for coarsely crushing the first surplus portion S1 by rotation. In addition, the second coarse crushing portion 3B has at least one second rotary blade 31B for coarsely crushing the second surplus portion S2 by rotation.

Incidentally, the sheet manufacturing apparatus 100 transports the raw material M1 to the side of the coarse crushing portion 12 by the rotation of the roller 113 from the first supply portion 111. In addition, the second supply portion 112 is disposed above the first supply portion 111, and inserts the raw material M1 into the insertion port 114, and transports the raw material M1 to the side of the coarse crushing portion 12. That is, in a plan view of the sheet manufacturing apparatus 100, the direction of the raw material M1 transported from the first supply portion 111 and the second supply portion 112 is the same direction as each other. However, in a plan view of the coarse crushing portion 12, the transport direction of the sheet S is in a relationship that intersects with the transport direction of the raw material M1. Therefore, it is difficult to coarsely crush the first surplus portion S1 and the second surplus portion S2 cut from the sheet S with the coarse crushing blade 121.

Therefore, by providing the first rotary blade 31A for coarsely crushing the first surplus portion S1 and the second rotary blade 31B for coarsely crushing the second surplus portion S2 separately from the coarse crushing blade 121, it is possible to coarsely crush the first surplus portion S1 and the second surplus portion S2 without excess or deficiency. In addition, when designing the sheet manufacturing apparatus 100, it is possible to appropriately change the arrangement position (layout) of the surplus portion coarse crushing apparatus 1 according to the apparatus configuration of the sheet manufacturing apparatus 100, and thus it contributes to reduction in the size of the sheet manufacturing apparatus 100. In particular, the surplus portion coarse crushing apparatus 1 is disposed so as to at least partially overlap with the coarse crushing portion 12 in a plan view of the sheet manufacturing apparatus 100, so that it can contribute to more reduction in the size.

As described above, each of the first rotary blades 31A can rotate about the shaft member 321 or the shaft member 322 (shaft) that extends in the direction (y direction) intersecting the transport direction of the sheet S. As a result, the first surplus portion S1 is smoothly inserted toward the first rotary blade 31A while being transported in the transport direction of the sheet S. As a result, the first surplus portion S1 can be rapidly coarsely crushed.

In addition, each of the second rotary blade 31B can rotate about the shaft member 321 or the shaft member 322 (shaft) that extends in the direction (y direction) intersecting the transport direction of the sheet S. As a result, the second surplus portion S2 is smoothly inserted toward the second rotary blade 31B while being transported in the transport direction of the sheet S. As a result, the second surplus portion S2 can be rapidly coarsely crushed.

As described above, the sheet S is divided into the sheet body serving as the usable portion S3, the first surplus portion S1, and the second surplus portion S2 (refer to FIG. 4). As shown in FIG. 5, the first surplus portion S1 bends in order from the portion cut from the sheet S toward the surplus portion coarse crushing apparatus 1 positioned below the falling direction following the gravity (similar to second surplus portion S2).

As shown in FIGS. 4 and 5, before separation of the first surplus portion S1 from the usable portion S3 (sheet body) is completed, the first coarse crushing portion 3A can start crushing the first surplus portion S1 partially connected to the sheet S.

For example, in a case where the first surplus portion S1 after having separated from the usable portion S3, that is, the first surplus portion S1 completely separated from the usable portion S3 is intended to be coarsely crushed by the first coarse crushing portion 3A, there is a possibility that the first surplus portion S1 may deviate from the first coarse crushing portion 3A and fall depending on conditions of use of the sheet manufacturing apparatus 100. Therefore, by starting the coarse crushing of the first surplus portion S1 by the first coarse crushing portion 3A as described above, as soon as the first surplus portion S1 is formed, the first surplus portion S1 can be coarsely crushed immediately. As a result, the first surplus portion S1 can be accurately coarsely crushed.

In addition, similar to the first coarse crushing portion 3A, before separation of the second surplus portion S2 from the usable portion S3 (sheet body) is completed, the second coarse crushing portion 3B can start crushing the second surplus portion S2 partially connected to the sheet S.

For example, in a case where the second surplus portion S2 after having separated from the usable portion S3, that is, the second surplus portion S2 completely separated from the usable portion S3 is intended to be coarsely crushed by the second coarse crushing portion 3B, there is a possibility that the second surplus portion S2 may deviate from the second coarse crushing portion 3B and fall depending on conditions of use of the sheet manufacturing apparatus 100. Therefore, by starting the coarse crushing of the second surplus portion S2 by the second coarse crushing portion 3B as described above, as soon as the second surplus portion S2 is formed, the second surplus portion S2 can be coarsely crushed immediately. As a result, the second surplus portion S2 can be accurately coarsely crushed.

As described above, in addition to being able to collectively rotationally drive each of the first rotary blades 31A, the drive unit 32 can also collectively rotationally drive each of the second rotary blades 31B. As a result, the first coarse crushing portion 3A and the second coarse crushing portion 3B can operate in synchronism with each other. By such an operation, for example, it is possible to prevent one of the first surplus portion S1 coarsely crushed in the first coarse crushing portion 3A and the second surplus portion S2 coarsely crushed in the second coarse crushing portion 3B from being pulled stronger than the other so that an unreasonable force is applied to the usable portion S3, and to prevent deformation such as wrinkles from occurring. It is preferable that the first coarse crushing portion 3A be provided on one side of the shaft member 321 (shaft member 322) and the second coarse crushing portion 3B be provided on the other side, and the first coarse crushing portion 3A and the second coarse crushing portion 3B be separated from each other. In addition, by providing the first coarse crushing portion 3A and the second coarse crushing portion 3B on the same shaft member 321 (shaft member 322), the motor 324 and the reduction gear 323 can be used in common, and it can contribute to reduction in size.

The operation of the first coarse crushing portion 3A may be performed continuously or intermittently, for example, while the sheet S is being manufactured (similar to second coarse crushing portion 3B). In the case where the operation of the first coarse crushing portion 3A is intermittently performed, an operation start timing can be the timing when the detection unit detects that the first surplus portion S1 enters the first coarse crushing portion 3A. In addition, an operation stop timing can be the timing when a predetermined time is elapsed since the detection by the detection unit was canceled.

As shown in FIG. 4, the surplus portion coarse crushing apparatus 1 (sheet manufacturing apparatus 100) is provided with the first guide portion 4A for guiding the first surplus portion S1 from the second cutter 212 of the cutting portion 21 to the first coarse crushing portion 3A, and the second guide portion 4B for guiding the second surplus portion S2 from the second cutter 212 (cutting portion 21) to the second coarse crushing portion 3B. As a result, the first surplus portion S1 can be rapidly and accurately crushed by the first coarse crushing portion 3A and the second surplus portion S2 can be rapidly and accurately coarsely crushed by the second coarse crushing portion 3B.

The first guide portion 4A is disposed between the cut sheet S and the first rotary blade 31A. The second guide portion 4B is disposed between the cut sheet S and the second rotary blade 31B. Since the first guide portion 4A and the second guide portion 4B have the same configuration except that the arrangement positions are different, the first guide portion 4A will be representatively described.

As shown in FIG. 5, the first guide portion 4A is formed of a cylindrical body having an upper opening portion 41 that opens upward and a lower opening portion 42 that opens downward, that is, the first rotary blade 31A side. In addition, an inner peripheral portion 43 of the first guide portion 4A has a tapered shape whose inner diameter gradually decreases downward.

The first surplus portion S1 is bended from the downstream end side and is inserted into the upper opening portion 41 of the first guide portion 4A. In the process of passing through the first guide portion 4A, the first surplus portion S1 reaches the lower opening portion 42 while abutting the inner peripheral portion 43 of the first guide portion 4A. Thereafter, the first surplus portion S1 can exit from the lower opening portion 42 of the first guide portion 4A, and is inserted into the first coarse crushing portion 3A at the end. As a result, the first surplus portion S1 is coarsely crushed by the first coarse crushing portion 3A.

The surplus portion coarse crushing apparatus 1 may have a configuration in which the first guide portion 4A and the second guide portion 4B are omitted.

The surplus portion coarse crushing apparatus 1 (sheet manufacturing apparatus 100) is provided with the accumulation portion 5 for temporarily accumulating the coarse crushed piece (first coarse crushed piece) S1' in which the first surplus portion S1 is coarsely crushed by the first coarse crushing portion 3A, and the coarse crushed piece (second coarse crushed piece) S2' in which the second surplus portion S2 is coarsely crushed by the second coarse crushing portion 3B. As a result, for example, it is possible to facilitate transfer of the coarse crushed piece S1' and the coarse crushed piece S2' to the defibrating portion 13 via the pipe 241, and thus improving the transfer efficiency.

As shown in FIGS. 2 and 3, the accumulation portion 5 has a box-like shape and can accommodate the first rotary blades 31A and the second rotary blades 31B on the inside thereof. In addition, the lower portion of the accumulation portion 5 is a tapered portion 51 having a tapered shape. The tapered portion 51 opens inside the chute 122 of the coarse crushing portion 12. As a result, it is possible to accumulate collectively the coarse crushed piece S1' and the coarse crushed piece S2' toward the chute 122 and discharge these to the chute 122 as they are. The coarse crushed piece S1' and the coarse crushed piece S2' can join the coarse crushed piece M2.

In addition, since the accumulation portion 5 has a box shape, the shape is simple. As a result, it is possible to prevent accumulation of the coarse crushed piece S1' and the coarse crushed piece S2' in the accumulation portion 5.

In addition, as described above, the sheet manufacturing apparatus 100 is provided with the coarse crushing portion 12 for coarsely crushing the raw material M1 (used sheet, that is, raw material including fibers), and the defibrating portion 13 for defibrating the raw material M1 (used sheet) coarsely crushed by the coarse crushing portion 12, that is, the coarse crushed piece M2. In addition, the sheet manufacturing apparatus 100 is provided with the tapered portion 51 (accumulation portion 5) functioning as a transfer portion for transferring the materials accumulated in the accumulation portion 5 (coarse crushed piece S1' and coarse crushed piece S2') to the coarse crushing portion 12 or the defibrating portion 13 (coarse crushing portion 12 in the embodiment).

The coarse crushed piece S1' and the coarse crushed piece S2' pass through the tapered portion 51 and join the coarse crushed piece M2 in the chute 122. Thereafter, the coarse crushed piece S1' and the coarse crushed piece S2' can pass through the pipe 241 and reach the defibrating portion 13 in a mixed state with the coarse crushed piece M2. The coarse crushed piece S1' and the coarse crushed piece S2' are defibrated by the defibrating portion 13 and are thereafter used for manufacturing the sheet S, that is, are used as a material of the sheet S. As a result, the coarse crushed piece S1' and the coarse crushed piece S2' can be recycled. As described above, in the sheet manufacturing apparatus 100, in addition to being able to use the defibrating portion 13 for defibrating the coarse crushed piece M2, the defibrating portion 13 can be used for defibrating the coarse crushed piece S1' and the coarse crushed piece S2', so that the common use (commonality) of the defibrating portion 13 is achieved. As a result, the configuration of the sheet manufacturing apparatus 100 can be simplified.

In the embodiment, the sheet manufacturing apparatus 100 is configured such that the coarse crushed piece S1' and the coarse crushed piece S2' are transferred to the coarse crushing portion 12, and the invention is not limited thereto. The coarse crushed piece S1' and the coarse crushed piece S2' may be configured so as to be transferred to the defibrating portion 13 by bypassing the coarse crushing portion 12.

In addition, in the sheet manufacturing apparatus 100, the transfer portion for transferring the coarse crushed piece S1' and the coarse crushed piece S2' may be omitted. In this case, the coarse crushed piece S1' and the coarse crushed piece S2' accumulated in the accumulation portion 5 can be transported to the coarse crushing portion 12 or the defibrating portion 13, for example, by manual work or the like.

In addition, in the sheet manufacturing apparatus 1, in a state where the coarse crushed piece M2, the coarse crushed piece S1', and the coarse crushed piece S2' are mixed, the mixture is defibrated in the defibrating portion 13, and thus, the first surplus portion S1 and the second surplus portion S2 can be recycled for manufacturing the sheet S.

In addition, in the sheet manufacturing apparatus 1, in plan view, the direction where the raw material M1 is transported to the coarse crushing portion 12 and the transport direction of the sheet S intersect with each other, and at least a portion of the accumulation portion 5 and the chute (hopper) 122 overlap each other. As a result, the size of the sheet manufacturing apparatus 1 can be reduced.

Second Embodiment

Figure 7:
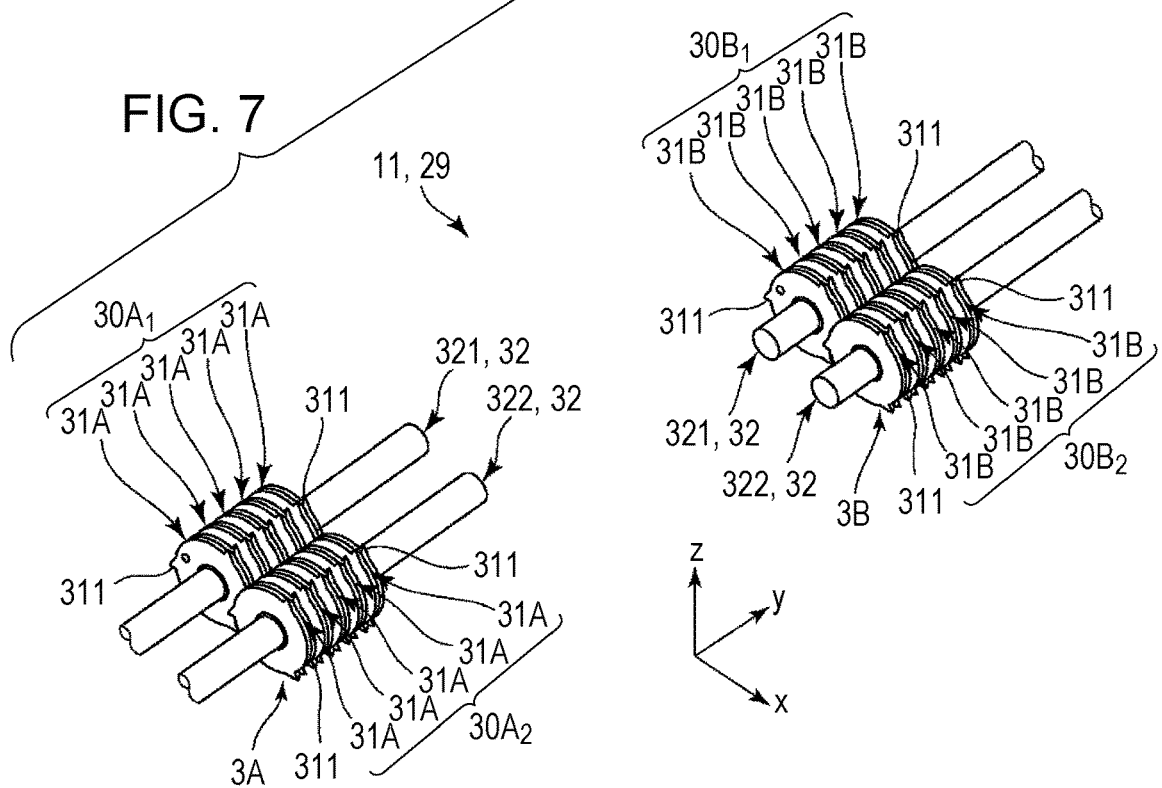
FIG. 7 is a perspective view showing a first coarse crushing portion and a second coarse crushing portion for coarsely crushing a surplus portion of a sheet in a vicinity of a most upstream side of a sheet manufacturing apparatus (second embodiment) of the invention.

FIG. 7 is a perspective view showing a first coarse crushing portion and a second coarse crushing portion for coarsely crushing a surplus portion of a sheet in a vicinity of a most upstream side of a sheet manufacturing apparatus (second embodiment) of the invention.

Hereinafter, a second embodiment of the sheet manufacturing apparatus of the invention will be described with reference to the drawing, the differences from the above-described embodiment will be mainly described, and description of similar matters will be omitted.

This embodiment is the same as the first embodiment except that the configurations of the first coarse crushing portion and the second coarse crushing portion are different from these of the first embodiment.

As shown in FIG. 7, in the embodiment, the first coarse crushing portion 3A and the second coarse crushing portion 3B are configured to be able to operate independently of each other. Such a configuration is not particularly limited, and, for example, each of the first coarse crushing portion 3A and the second coarse crushing portion 3B may be configured to have the drive unit 32. As a result, for example, in a case where the formation of the second surplus portion S2 is omitted at the time of manufacturing the sheet S, it is possible to manufacture the sheet S by operating the first coarse crushing portion 3A and stopping the second coarse crushing portion 3B. As a result, it is possible to suppress the power consumption by the amount corresponding to the stoppage of the second coarse crushing portion 3B, and energy saving can be achieved.

Third Embodiment

Figure 8:
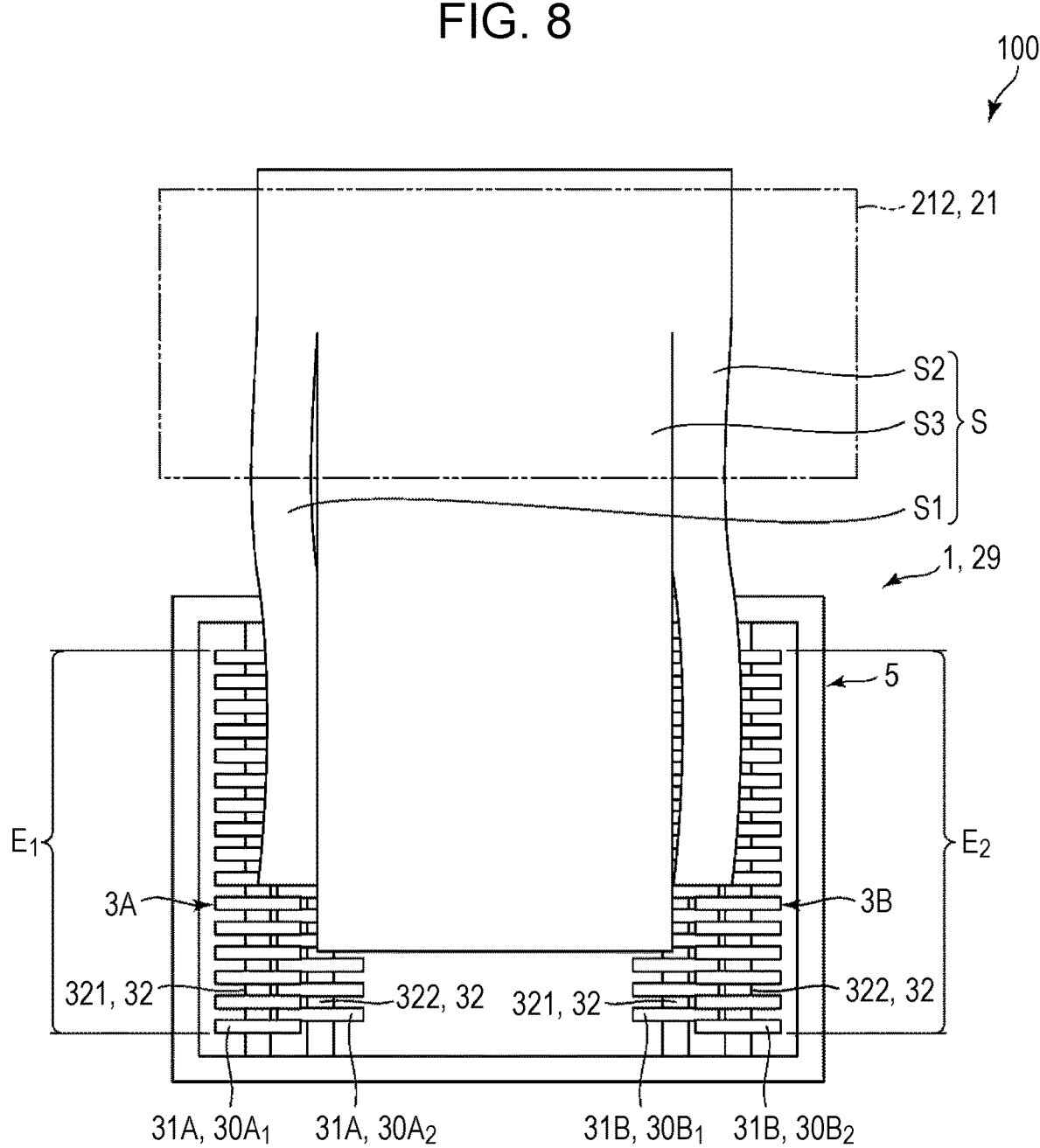
FIG. 8 is a plan view showing a state where a surplus portion of a sheet is coarsely crushed in a vicinity of a most upstream side of a sheet manufacturing apparatus (third embodiment) of the invention.

FIG. 8 is a plan view showing a state where a surplus portion of a sheet is coarsely crushed in a vicinity of a most upstream side of a sheet manufacturing apparatus (third embodiment) of the invention.

Hereinafter, a third embodiment of the sheet manufacturing apparatus of the invention will be described with reference to the drawing, the differences from the above-described embodiment will be mainly described, and description of similar matters will be omitted.

This embodiment is the same as the first embodiment except that the arrangement aspects of the first coarse crushing portion and the second coarse crushing portion are different from these of the second embodiment.

As shown in FIG. 8, in the embodiment, both of the first coarse crushing portion 3A and the second coarse crushing portion 3B are arranged such that the shaft member 321 and the shaft member 322 are parallel to the transport direction (x direction) of the sheet S. As a result, each of the first rotary blades 31A can rotate about the shaft member 321 or the shaft member 322 (shaft) extending in the transport direction (x direction) of the sheet S. As a result, for example, even in a case where the first guide portion 4A is omitted, even if the first surplus portion S1 is inserted into any portion in a range $E_1$ where the plurality of first rotary blades 31A are disposed in the first coarse crushing portion 3A, the first surplus portion S1 is accurately coarsely crushed there. As a result, in such a configuration, it is possible to ensure the widest possible range $E_1$ by the first coarse crushing portion 3A, which is a preferable configuration.

In addition, the second rotary blade 31B can rotate around the shaft member 321 or the shaft member 322 (shaft) extending in the transport direction (x direction) of the sheet S. As a result, for example, even in a case where the second guide portion 4B is omitted, even if the second surplus portion S2 is inserted into any portion in a range $E_2$ where the plurality of second rotary blades 31B are disposed in the second coarse crushing portion 3B, the second surplus portion S2 is accurately coarsely crushed there. As a result, in such a configuration, it is possible to ensure the widest possible range $E_2$ by the second coarse crushing portion 3B, which is a preferable configuration.

Fourth Embodiment

Figure 9:
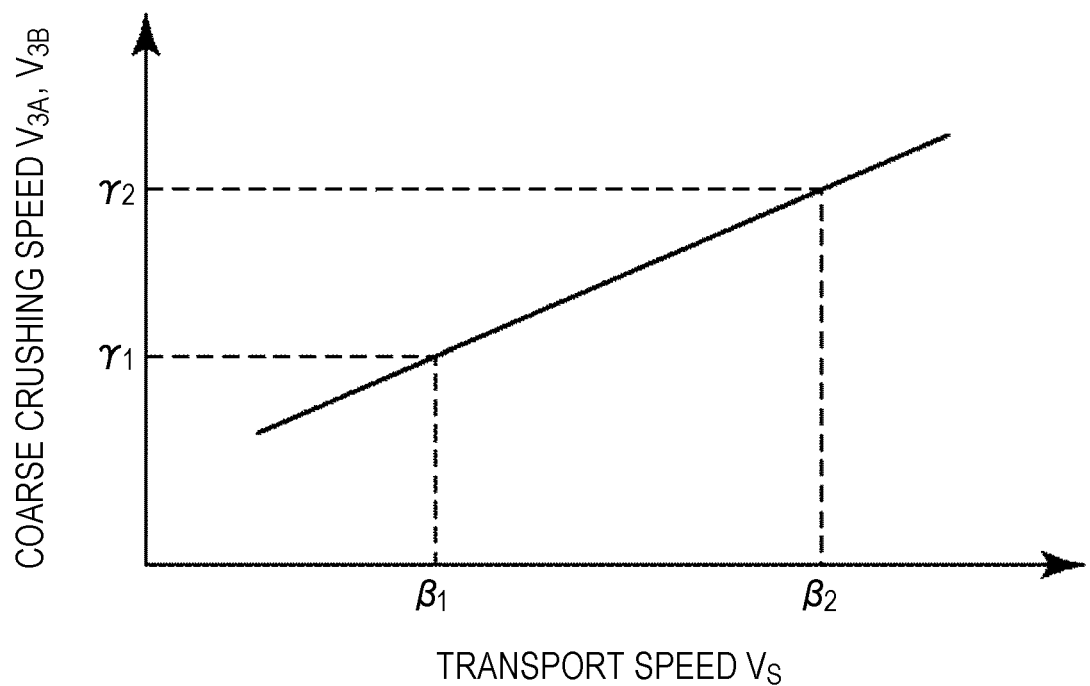
FIG. 9 is a graph showing a relationship between a transport speed for transporting a sheet and a coarse crushing speed for crushing a surplus portion of the sheet of a sheet manufacturing apparatus (fourth embodiment) of the invention.

FIG. 9 is a graph showing a relationship between a transport speed for transporting a sheet and a coarse crushing speed for crushing a surplus portion of the sheet of a sheet manufacturing apparatus (fourth embodiment) of the invention.

Hereinafter, a fourth embodiment of the sheet manufacturing apparatus of the invention will be described with reference to the drawing, the differences from the above-described embodiment will be mainly described, and description of similar matters will be omitted.

This embodiment is the same as the first embodiment except that the configurations of the first coarse crushing portion and the second coarse crushing portion are different from these of the second embodiment.

The heating roller 204 as the transport portion 205 for transporting the sheet S, the first coarse crushing portion 3A, and the second coarse crushing portion 3B are electrically connected to the control unit 28, respectively, and the operation is controlled by the control unit 28.

As a result, the heating roller 204 (transport portion 205) is configured so that a transport speed $V_s$ of the sheet S is variable. In addition, the first coarse crushing portion 3A is configured such that a coarse crushing speed $V_{3A}$ that coarsely crushes the first surplus portion S1 changes in response to (accordance with) the change in the transport speed $V_s$ of the sheet S. In addition, the second coarse crushing portion 3B is configured such that a coarse crushing speed $V_{3B}$ that coarsely crushes the second surplus portion S2 changes in response to (accordance with) the change in the transport speed $V_s$ of the sheet S. Such control is performed by the control unit 28. The relationship between the transport speed $V_s$ and the coarse crushing speeds $V_{3A}$, $V_{3B}$ can be obtained, for example, by a calibration curve as shown in the graph of FIG. 9. This calibration curve is previously stored in the control unit 28.

For example, in a case where the transport speed $V_s$ changes from $\beta_1$ to $\beta_2$, the coarse crushing speeds $V_{3A}$ and $V_{3B}$ can be changed from $\gamma_1$ to $\gamma_2$, respectively. As a result, even if the transport speed $V_s$ is changed, it is possible to prevent the first surplus portion S1 and the second surplus portion S2 from being excessively pulled or excessively bent, and thus it is possible to coarsely crush each surplus portion without excess or deficiency.

Hereinbefore, although the sheet manufacturing apparatus of the invention is described with reference to the illustrated embodiments, the invention is not limited thereto. Each portion forming the sheet manufacturing apparatus can be replaced with any configuration capable of exerting the same function. In addition, any components may be added.

In addition, the sheet manufacturing apparatus of the invention may be a combination of any two or more configurations (features) of each embodiment described above.

In addition, depending on the aspect of use of the sheet manufacturing apparatus, there may be a case where at least one of the first coarse crushing portion (first rotary blade) and the second coarse crushing portion (second rotary blade) is provided.

What is claimed is:

1. A sheet manufacturing apparatus comprising:
a sheet forming device that forms a sheet using a material including fibers;
a transport device that transports the sheet;
a cutting device that cuts one edge portion and the other edge portion of the sheet positioned in a direction intersecting a transport direction of the sheet;
a first coarse crushing device that coarsely crushes a first surplus portion generated by cutting the one edge portion by the cutting device into small pieces of 10 mm or more;
a second coarse crushing device that coarsely crushes a second surplus portion generated by cutting the other edge portion by the cutting device into small pieces of 10 mm or more; and
an accumulation device that accumulates: (i) a first coarse crushed piece in which the first surplus portion is coarsely crushed by the first coarse crushing device and (ii) a second coarse crushed piece in which the second surplus portion is coarsely crushed by the second coarse crushing device.

2. The sheet manufacturing apparatus according to claim 1, wherein
the first coarse crushing device starts coarse crushing of the first surplus portion of which a portion is connected to the sheet, and
the second coarse crushing device starts coarse crushing of the second surplus portion of which a portion is connected to the sheet.

3. The sheet manufacturing apparatus according to claim 1, wherein
the first coarse crushing device has at least one first rotary blade for coarsely crushing the first surplus portion by rotation, and
the second coarse crushing device has at least one second rotary blade for coarsely crushing the second surplus portion by rotation.

4. The sheet manufacturing apparatus according to claim 3, wherein
the first rotary blade rotates around a direction intersecting with the transport direction as an axis, and
the second rotary blade rotates around a direction intersecting with the transport direction as an axis.

5. The sheet manufacturing apparatus according to claim 3, wherein
the first rotary blade rotates around a direction along the transport direction as an axis, and
the second rotary blade rotates around a direction along the transport direction as an axis.

6. The sheet manufacturing apparatus according to claim 1, further comprising:
a first guide portion that guides the first surplus portion to the first coarse crushing portion; and
a second guide portion that guides the second surplus portion to the second coarse crushing portion.

7. The sheet manufacturing apparatus according to claim 1, further comprising:
a control unit configured to:
change a coarse crushing speed of the first coarse crushing device that coarsely crushes the first surplus portion according to a transport speed of the sheet, and
change a coarse crushing speed of the second coarse crushing device that coarsely crushes the second surplus portion according to the transport speed of the sheet.

8. The sheet manufacturing apparatus according to claim 1, wherein the first coarse crushing device and the second coarse crushing device operate in sync with each other.

9. The sheet manufacturing apparatus according to claim 1, wherein the first coarse crushing device and the second coarse crushing device operate independently of each other.

10. The sheet manufacturing apparatus according to claim 1, further comprising:
a defibrating device that defibrates a coarse crushed piece discharged from a coarse crushing device for coarsely crushing a raw material including fibers, wherein
in a state where the coarse crushed piece, the first coarse crushed piece, and the second coarse crushed piece are mixed, the mixture is defibrated in the defibrating device.

11. The sheet manufacturing apparatus according to claim 1, further comprising:
a coarse crushing device that coarsely crushes a raw material including fibers;
a defibrating device that defibrates the coarse crushed piece coarsely crushed by the coarse crushing device; and
a transfer device that transfers the first coarse crushed piece and the second coarse crushed piece accumulated in the accumulation device to the defibrating device.

12. The sheet manufacturing apparatus according to claim 1, further comprising:
a raw material supply device that supplies a raw material containing fibers;
a coarse crushing device that coarsely crushes the raw material; and a hopper that receives the coarse crushed piece coarsely crushed by the coarse crushing device, wherein in a plan view, a direction where the raw material is transported to the coarse crushing device and the transport direction of the sheet intersect with each other, and at least a portion of the accumulation device and the hopper overlap each other.

13. The sheet manufacturing apparatus according to claim 3, wherein the accumulation device has a box-like shape; and the accumulation device is configured to accommodate a portion or an entirety of: (a) the at least one first rotary blade of the first coarse crushing device, and/or (b) the at least one second rotary blade of the second coarse crushing device.

14. The sheet manufacturing apparatus according to claim 1, wherein the accumulation device is configured to temporarily accumulate the first coarse crushed piece and the second coarse crushed piece and transferring the first coarse crushed piece and the second coarse crushed piece that has accumulated to a defibrating device.

15. A sheet manufacturing apparatus comprising:

a conveyer configured to transport a sheet;

a cutter configured to cut the sheet;

a first coarse crusher and a second coarse crusher, each being configured to coarsely crush the sheet; and an accumulation device configured to accumulate crushed pieces; and a processor or integrated circuit programmed to:

transport, by the conveyer, the sheet in a first direction, cut, by the cutter, a first edge and a second edge of the sheet parallel to the first direction, coarsely crush, by the first coarse crusher, a first surplus portion generated by cutting the first edge of the sheet by the cutter into small pieces of 10 mm or more, coarsely crush, by the second coarse crusher, a second surplus portion generated by cutting the second edge of the sheet by the cutter into small pieces of 10 mm or more, wherein:

the accumulation device accumulates a first coarse crushed piece in which the first surplus portion is coarsely crushed by the first coarse crushing device and a second coarse crushed piece in which the second surplus portion is coarsely crushed by the second coarse crushing device.

16. The sheet manufacturing apparatus according to claim 15, wherein the accumulation device has a box-like shape; and the accumulation device is configured to accommodate a portion or an entirety of: (a) at least one first rotary blade of the first coarse crushing device, and/or (b) at least one second rotary blade of the second coarse crushing device.

17. The sheet manufacturing apparatus according to claim 15, wherein the accumulation device is configured to temporarily accumulate the first coarse crushed piece and the second coarse crushed piece and transferring the first coarse crushed piece and the second coarse crushed piece that has accumulated to a defibrating device.

\* \* \* \* \*